United States Patent
Carlsson et al.

[15] 3,650,203
[45] Mar. 21, 1972

[54] ARRANGEMENT IN HEAT PRESSES

[72] Inventors: Bengt J. Carlsson; Mauritz R. G. Sundberg, both of Motala, Sweden

[73] Assignee: Aktiebolaget Motala Verkstad, Motala, Sweden

[22] Filed: Nov. 12, 1970

[21] Appl. No.: 88,882

Related U.S. Application Data

[62] Division of Ser. No. 766,175, Oct. 9, 1968, Pat. No. 3,602,134.

[30] Foreign Application Priority Data

Oct. 19, 1967   Sweden..............................14346/67

[52] U.S. Cl...........................................100/93 P, 100/152
[51] Int. Cl.....................................B02c 11/08, B30b 15/34
[58] Field of Search................100/93, 92, 38, 151, 152, 153, 100/118; 156/580, 322, 582, 583; 18/16 F, 17 H, 17 L, 6 E, 5 BH

[56] References Cited

UNITED STATES PATENTS

| | | | |
|---|---|---|---|
| 1,391,805 | 9/1921 | Subers | 18/6 |
| 2,562,641 | 7/1951 | Saunders | 156/322 |
| 3,185,073 | 5/1965 | Hartesveldt et al. | 100/93 P |
| 3,406,472 | 10/1968 | Solomon | 100/93 P |

*Primary Examiner*—Peter Feldman
*Attorney*—Oldham & Oldham

[57] ABSTRACT

Apparatus for use in heat presses is provided and includes an endless conveyor belt drawn through a press opening between two hot plates. Goods to be pressed are placed on the upper part of the conveyor belt and the section of the conveyor belt receiving goods for immediate movement into the press is heated. Apparatus is provided for heating the conveyor belt and the goods thereon immediately prior to movement of the goods into the press for processing therein.

7 Claims, 2 Drawing Figures

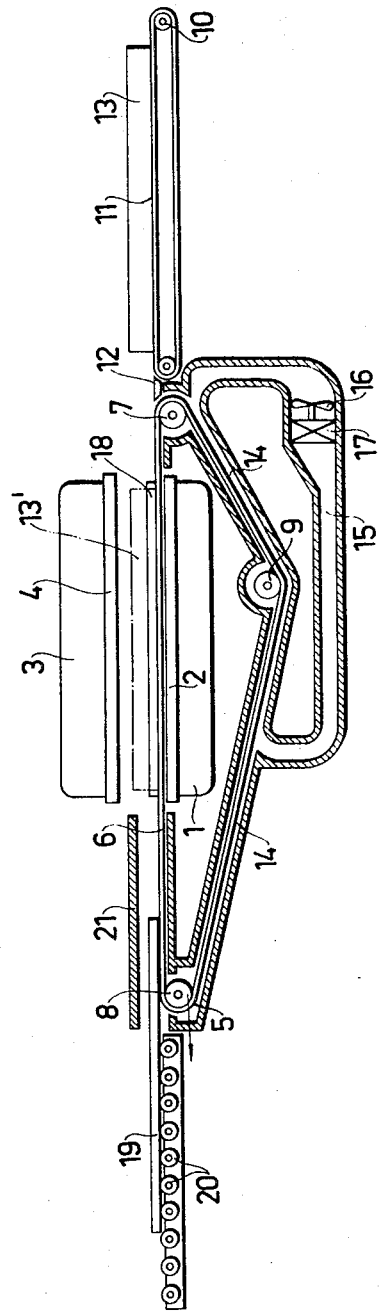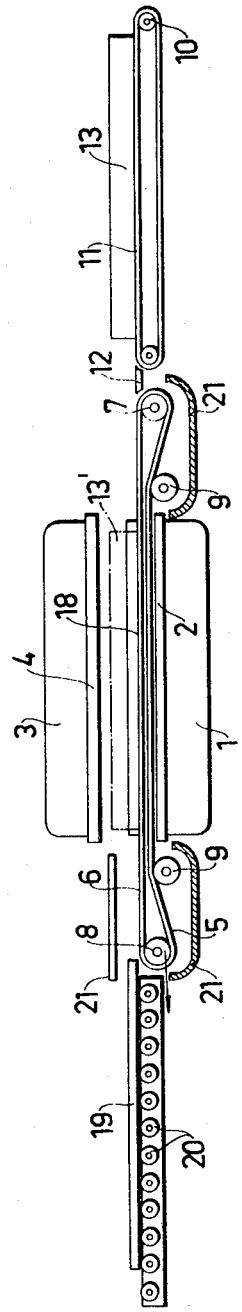

ARRANGEMENT IN HEAT PRESSES

This a division of U.S. Pat. applications Ser. No. 766,175 filed Oct. 9, 1968, now U.S. Pat. No. 3,602,134.

During latter years it has become more and more usual in the manufacture of particle board and the like to use single-story hot presses, provided with a conveying system having an endless conveyor belt passing through the press opening and by means of which the pressed particle board is removed from the press and a new particle board blank in the form of a totally unpressed or lightly pre-pressed cake of particles is introduced into the press when reloading or charging said press. In order to provide for the desired manufacturing capacity in system using single-story presses the presses themselves have been made very large, with lengths of up to 10–15 meters and widths of up to 2–3 meters.

The conveyor belt must be made of a material capable of withstanding the heat in the press, and hitherto a steel belt of minimum possible thickness has been used. The thickness of the belt is generally from 1–1.5 mm. As a rule the conveyor belt extends sufficiently beyond the press so that the particle cake can also be formed on the belt, and hence the belt must be cooled at those regions thereof where the cake is to be formed, so that said cake is not subjected to heat and begins to harden before the actual pressing operation.

Suggestions have been made, however, for instance in the Swedish Pat. No. 211,312, whereby the conveyor belt, press belt, which passes through the press opening, is only drawn through the press itself and the particle cake formed on a totally different endless conveyor belt arranged remote from the press, and then placed on a third endless conveyor belt which is also remote from the press but positioned immediately adjacent the charging end of the press belt. The particle cake is not transferred on the latter conveyor belt to the press belt until the press is charged; when the particle cake is passed by the press band direct into the furnace. Thus, the press belt need not be cooled before the particle cake is placed thereon since any heat which the cake might be subjected to from the press belt is not sufficient to affect the same to any appreciable extent before the press is closed, after the short time taken to effect the charge. However, even in this instance the portion of the press band located outside the press opening becomes cooled to almost room temperature since the surface area of the belt is large in relation to its mass and, moreover, because it is cooled by the large rollers which drive and guide the belt.

In presses used hitherto the particle cake is thus passed into the press on a belt which has been completely cooled or which is in all events relatively cool. This impairs the supply of heat to the underside of the particle board during the pressing operation, so that firstly the pressing time is increased and the production capacity becomes lower than would be necessary if the belt were hot at the beginning of the pressing operation, and secondly that the heat treatment of the particle board is asymetrical.

The press belt will also attempt to expand during the reheating process in the press, but frictional forces counteract longitudinal expansion in the plane of the belt. Consequently, high pressure stresses and strains are built up in the belt and may cause plastic deformations therein so that said belt buckles and soon becomes unusable. It has therefore been necessary either to restrict the temperature of the press to a certain permissable upper limit or to lower the pressure exerted by the press a repeated number of times during the pressing operation to enable the belt to expand. The necessary press time, however, decreases with increasing press temperature and a limiting of the press temperature to a value lower than the highest permissable with respect to the chemical and physical processes in the particle board during the pressing operation consequently means a limiting of the production capacity. Unloading of the pressure means a deviation from the desired pressure-time sequence during the pressing operation, and also results in an extension of the pressing period and a reduction in the production capacity.

The latter disadvantages may, of course, be eliminated by using press belts which present a combination of coefficient of linear expansion, coefficient of elasticity and smash limit that eliminates the risk of plastic deformation in the belt at the highest press temperatures which may prevail with respect to the particle board. The inventors are not aware, however, that a belt can be obtained at present which presents properties which suffice for the high press temperatures of 250° to 300° C. which are now employed. With regard to the welds in the belt, which are still weaker than the actual belt material despite the fact that welding processes have progressively improved, the increasing temperature of the belt should be restricted during the pressing operation to about 100 ° C. to ensure that the belt does not become damaged when used for along period of time.

Finally, it has been observed that particle board pressed in presses provided with press belts has a tendency to obtain corrugations on the side facing the press belt, at least in the case of low density particle board, where the finishing pressing operation is effected at a relatively low surface pressure to the board. The press belts when examined were found to be faultless and smooth. Investigations into the phenomenon have not yet been completed, but the provable reason for the corrugating effect on the board is that the pressure forces in the press belt cause the thin belt to buckle away from the press platen. If the mechanical strength of the particle board becomes too low during any period of pressing operation local buckling occurs, which unloads the pressure forces in the press belt but cause recesses in the particle board. Deformation of the press belt constantly takes place within the elastic limit, and hence the belt does not remain deformed upon termination of the pressing operation. The phonomenon has been observed when pressing at temperatures of 200 ° C. and has not caused any great disadvantage since the waves or corrugations are removed at the subsequent graduating grinding of the particle boards. Because of the corrugations, however, the amount of material removed during the grinding operation is somewhat greater than would otherwise be necessary which results in increased costs. The magnitude of the local buckling of the belt increases with increased temperature and it is probable that the disadvantages cause by the buckling effect rapidly increase in significance when the press temperature is increased.

The object of the present invention is to reduce or fully eliminate the aforementioned disadvantage in hot presses which are provided with a conveyor system having a conveyor belt drawn through the press opening for charging the press. This object is achieved by means of the invention which is mainly characterized in that at least the portion of the conveyor belt which is to receive goods for the next charge to the press and pass said goods into the press opening and remain there during the subsequent pressing operation is heated to a temperature before being introduced into the press which deviates from the temperature of the hot plates by at most 100° C. and which is preferably approximately the same temperature as that of the hot plates.

The invention will now be described with reference to the accompanying drawings, during which further characteristic features of the invention will be disclosed.

FIG. 1 is a diagrammatic side view of a single-story hot press for particle board intended for use when carrying out the method according to the invention.

FIG. 2 shows an alternative arrangement in such a press.

Of the actual press FIG. 1 only shows the stationary lower press platen 1 together with the lower hot plate 2 secured thereon, and the movable upper press platen 3 together with the upper hot plate 4 attached thereon, while the remaining parts of the press have been omitted for the sake of clarity.

The press is provided with a conveyor system 5 including an endless steel conveyor belt 6, the press belt, the upper part of which is drawn through the press opening at its underside. The under portion of the press belt 6 is drawn back below the press. The press belt 6 passes over a drive roller 7 arranged at the charging end of the press, a tension roller 8 arranged outside the discharged end of the press and a bridle or guide roller 9 arranged below the press. The drive roller 7 and the bridle roller 9 are stationarily positioned while the tension roller 8 is arranged to move somewhat horizontally and is biassed in the direction of the arrow, to maintain tension in the press belt 6.

Located at the charging end of the conveyor system 5 is a second conveyor means 10, which includes an endless conveyor belt 11, the transfer belt, so arranged that the upper surfaces of the two conveyors 5 and 10 and a slide plate 12 arranged therebetween form an essentially horizontal conveying path which lies in one and the same plane and on which the particle cake 13 to be pressed is introduced into the press opening when charging the press. The particle cake 13 has been formed and placed on the transfer belt 11 before charging, by means of known devices (Not Shown).

Located at the discharge end of the conveyor system 5 is a roller path 20 a similar conveying means, on which the pressed fiber boards are removed from the vicinity of the press.

The under portion of the press belt 6 is passed through a heat insulated passage 14, the heating passage, which surrounds the press belt 6 and the rollers 7, 8, 9 up to a level immediately below the level of the upper part of the press belt 6, at the under side of which the heat insulation is also drawn out in towards the press. Located at the discharge end of the conveyor 5 is another heat insulating cover or a radiation shield 21, arranged over the upper part of the press belt 6 beyond the press. A similar cover or radiation shield can also be provided over the press belt 6 at the charging end of the press, but auxiliary devices (not shown) situated in the vicinity to ensure that the particle cake 13 is passed undamaged over the slide plate 12 during the charging of the press would normally prevent the arrangement of a special heat insulating arrangement at this point. The shield is also unnecessary with respect to the function of the press belt 6 since the possible cooled section of the belt does not receive goods or remain in the press during the next charge, but is moved rapidly through the press opening and out to the discharge side of the press.

The rollers 7 and 8 of the conveyor are through passed and heated by a heating medium, suitable the same medium as that which heats the hot plates 2, 4 in the press. The devices provided to effect this may be of any conventional design and have not been shown in the drawing. The bridle roller 9 may also be heated in the same manner.

The two ends of a second heat insulated passage 15, the circulation passage, are connected to the heat passage 14 adjacent the drive roller 7 and at a position so far along the heat passage 14 that the section of the lower portion on the press belt 6 found located between the two connecting points is longer than the press opening. Inserted in the circulation channel or passage is a fan 16 which causes air to circulate through the said channel 15 and the channel 14, and a heat exchanger 17 in which the circulating air is heated, suitably by the same heating medium as that which heats the hot plates, 2, 4 in the press. For the sake of clarity the figure shows the circulation channel 15 arranged below the channel 14, but it is normally to advantage to position the circulation channel 15 by the side of said channel 14. The section of the press belt 6 located in the heating channel 14 between the point at which the circulation channel 15 is connected is heated in this way to essentially the same temperature as the press plates 2, 4, while the belt remains stationary during the pressing operation. In the illustrative embodiment the bridle roller 9 is also placed in the portion of the heating channel 14 through which the hot air circulates, and it need not therefore be heated in any other way. Naturally, the heating passage 14 should suitable be sealed at its both ends against the drive roller 7 and the tensioning roller 8 and the conveyor belt 6 passed over the rollers, so that unnecessary air exchange between the heating passage 14 and the outer end is avoided.

The figures depict the arrangement at that moment when the press has just been opened, subsequent to a completed pressing operation and when the recharging of the press is to begin. The latest pressed particle board 18 is still positioned in the press opening, resting on the press belt 6, which has remained stationary during the pressing operation and which still remains in the same position that it occupied during the pressing operation. The particle board 19 pressed in a preceding pressing operation may also remain at the discharge end, on the conveyor system 5, partly on the press belt 6 and partly on the roller path, unless it has been removed during the process.

As soon as the press has been opened to a sufficient extent it need not be fully open, the conveyor system 5 starts up and begins to discharge the pressed fiber board 18 from the press opening. At the same time or immediately afterwards the conveyor 10 is also started, the drives of the two conveyor 10 and 5 being connected in a known manner or a synchronized in some way so that the two conveyor belts 11 and 6 move at the same speed, while the particle cake 13 is passed over from the former to the latter. The particle cake 13 is then placed on a section of the press belt 6 which, prior to charging, has been heated in the heating passage 4 and immediately passed into the press, which, of course, must have completely opened before the particle cake reaches the press opening. When the cake 13 has adopted the position 13, shown by the chain line, within the press opening the conveyor 5 is stopped, whereafter the press is immediately closed and pressing commences. The pressed particle board 18 has been passed out of the press to the position 19, and can be removed for further processing.

The drive means for the conveyor 10 is disengaged from the drive means of the conveyor 5 when the cake 13 has left the transfer belt 11, whereafter the belt 10 can be driven separately while a new particle cake is placed on the transfer belt 11 before the next press charging operation.

FIG. 2 shows an alternative arrangement of the conveyor 5 with the press belt 6 drawn through the press opening, which means that the heating passage 14 and circulation passage 15 and fan 16 and heat exchanger 17 can be omitted. FIG. 2 shows in other respect the same devices and arrangements as illustrated in FIG. 1. The same reference numerals have been used in both Figures for corresponding means and devices.

The lower portion of the press belt 6 of the conveyor 5 is drawn back in FIG. 2 through the press opening between the upper part of the press belt 6 and the lower hot plate 2, said part passing over two bridle rolls 9 placed at the ends of the lower press platen 1. The section of the lower portion, which during the pressing operation is located with the press, therefore becomes heated to approximately the temperature of the press plates without any special measures being taken. The conveyor 5 is also arranged so that the section of the press belts 6 located outside the press opening at the discharge end of the press and at the charging end thereof are practically of the same length.

When charging the press, the press belt 6 and the transfer belt 11 are operated so that the particle cake 13 is placed on that particular section of the press belt 6 which has been heated during the preceding pressing operation, and that this section is then returned into and remains in the press. At the same time essentially that section of the press belt 6 which during the preceding pressing operation is moved out of the press and back into the same, this time as a part of the lower portion of the press belt. In this way practically the same two sections of the press belt will take part in subsequent pressing operation and are therefore constantly held at approximately the temperature of the press plate, while remaining parts of the press belt 6 do not take part in the pressing operation and may adopt any lower temperature. Because of the unavoidable differences in length between the two sections of the press belt is located outside the press opening, caused by tolerances in manufacture, variations in temperature etc., the hot sections of the press belt will gradually move along the belt if no particular countermeasures are taken, but this has practically no importance with regard to the stresses and strains in the belt and heating of the press goods if the displacement does not take place too rapidly.

In the illustrative embodiment shown in FIG. 2 the rollers 7, 8, 9 of the conveyor 5 may, of course, be heated and the parts located outside the press may be heat insulated similarly to the embodiment shown in FIG. 1, so that the heated sections of the conveyor belts 6 are not unnecessarily cooled during the charging operation, but this may not be necessary. It should be sufficient to provide the periphery of the rollers with a heat insulating coating, since the hot sections of the press belt are only in contact with the rollers 7, 8, 9 for a period of from 3–5 seconds during the charging of the press, and to arrange simple draw and radiation shield 21 around the parts of the conveyor 5 located outside the press.

The invention is not restricted to pressing fiber boards or to the shown and described arrangement, but can be varied in many ways within the scope of the following claims. Heating of the rollers 7, 8, 9 of the conveyor 5 and of the air in the circulation passage 15 may be effected with some other heat medium or in a manner different to the one described and to a temperature different to that of the pressed plate, e.g., to a somewhat higher temperature if it is desired to compensate for cooling of the press belt 6 during the charging of the press.

Heating of the section of the press belt 6 which is to receive the goods 13 to be pressed on the next charge can also be effected when the lower part of the belt is returned under the press, as in FIG. 1, in a manner other than by circulating hot air, for instance with heating coils built in to the heating passage 14, electrical heating elements or the like. Moreover, it is not beyond bounds to exclude the special heating of a section of the belt 6 without the temperature of the belt section becoming too low in relation to the temperature of the press plates if the heat insulation is sufficiently well arranged, since heat is constantly passed into the heating passage by the press belts 6. In this instance, however, it is expedient to heat all the rollers 7, 8, 9 of the conveyor 5 so that when starting with a cooled conveyor too much time is not lost before these become sufficiently hot.

The means for placing the goods 13 on the press belt 6 may, of course, also be of a design different to that shown and described.

While one complete embodiment of the invention has been disclosed herein, it will be appreciated that modification of this particular embodiment of the invention may be resorted to without departing from the scope of the invention as defined in the appended claims.

What is claimed is:

1. An apparatus for processing goods by the application of heat and pressure, including a press, an endless conveyor belt at least one section of which extends through said press, and means to place units of unprocessed goods into said belt for movement into said press, the improvement comprising:
   means to heat a portion of said belt to within 100° C. of the pressing temperature, said heated portion of the belt adapted to receive and support a second unit of unprocessed goods, and said heated portion of the belt being that to be next moved into presses, press to carry said second unit therein.

2. Apparatus according to claim 1 including an enclosure surrounding said portion of the belt, and means to supply heat to said enclosure.

3. Apparatus according to claim 2 wherein said means to supply heat includes means to circulate air through said enclosure, and means to heat said air.

4. Apparatus according to claim 1 wherein said belt is entrained over a plurality of rollers, and means connect to at least one of said rollers to impart heat to said belt.

5. Apparatus according to claim 1 wherein means are provided to position said portion of said belt to pass through the opening of said press below the goods bearing portion of the belt so as to be heated by the heat of said press during the pressing operation.

6. A device for heat presses for forming articles by heat and pressure action and comprising a press including two hot plates forming a press opening, an endless driven conveyor belt formed from a solid metal band positioned to have an upper course drawn through the press opening between said hot plates, the press being charged by the goods to be pressed being placed on the upper course of said conveyor belt first in connection with the charging and then being immediately brought into the press opening by the conveyor belt, said conveyor belt being stationary during the pressing operation, and heating means to impart to at least the section of the conveyor belt which during next charging operation is to receive a unit of the goods and move it into the press opening and remain there during the following pressing operation a temperature deviating from the temperature of the hot plates by at most 100° C.

7. A device as in claim 6 wherein enclosure means are provided for the portion of said conveyor belt next to be moved into said press, and said heating means are adapted to heat said portion of said conveyor belt to substantially the same temperature as said hot plates.

* * * * *